United States Patent [19]

Hornung et al.

[11] Patent Number: 4,463,293

[45] Date of Patent: Jul. 31, 1984

[54] METHOD AND APPARATUS FOR SHUTTING OFF A POWER SCREWDRIVER

[75] Inventors: Friedrich Hornung, Stuttgart; Wolfgang Jundt, Ditzingen; Fritz Schädlich, Leinfelden-Echterdingen; Hans-Joachim Vogt, Stuttgart; Steffen Wünsch, Dettenhausen, all of Fed. Rep. of Germany

[73] Assignee: Robert Bosch GmbH, Stuttgart, Fed. Rep. of Germany

[21] Appl. No.: 477,624

[22] Filed: Mar. 22, 1983

[30] Foreign Application Priority Data

Mar. 25, 1982 [DE] Fed. Rep. of Germany ....... 3210929

[51] Int. Cl.³ ........................ H02P 1/22; H02H 7/085

[52] U.S. Cl. .................................... 318/284; 318/434; 318/467; 318/433; 318/739; 363/63

[58] Field of Search .................. 363/63; 318/433, 284, 318/739, 318, 314, 281, 285, 434; 81/469, 326

[56] References Cited

U.S. PATENT DOCUMENTS

| | | | |
|---|---|---|---|
| 3,008,074 | 11/1961 | Gregory | 318/284 X |
| 3,124,732 | 3/1964 | Dupy | 318/283 X |
| 3,551,770 | 12/1980 | Isaacs | 318/283 X |
| 3,803,467 | 4/1974 | Dorr | 318/467 X |
| 3,845,373 | 10/1974 | Totsu et al. | 318/434 |
| 3,892,146 | 7/1975 | Yasoshima | 81/469 |
| 4,056,762 | 11/1977 | Schädlich | 318/434 X |
| 4,158,799 | 6/1979 | Cappel et al. | 318/603 X |
| 4,175,247 | 11/1979 | Klemm | 318/466 |

FOREIGN PATENT DOCUMENTS

| | | | |
|---|---|---|---|
| 1949415 | 10/1970 | Fed. Rep. of Germany | 81/326 |
| 2242201 | 2/1975 | France | 81/469 |

*Primary Examiner*—G. Z. Rubinson
*Assistant Examiner*—Paul Shik Luen Ip
*Attorney, Agent, or Firm*—Frishauf, Holtz, Goodman & Woodward

[57] ABSTRACT

A power screwdrive that is equipped with a spring coupling between the motor drive and the tool spindle, a signal that indicates that a certain value of torque has been overstepped, at which the screwdriver must be sopped, first causes reversal of the motor, but before the motor appreciably turns in the reverse direction, powers shut-off, allowing the motor to coast. After another brief interval, power is reapplied to the motor in the original direction, again briefly. In this way it is possible for the final shut-off to occur when the motor is stopped and the spring is unstressed, avoiding oscillations of the motor-spring system. A triac bridge circuit makes possible quick reversals and brief applications of power. In such a bridge circuit, precautions must be taken to be sure one pair of triacs is extinguished before the other pair is ignited.

14 Claims, 5 Drawing Figures

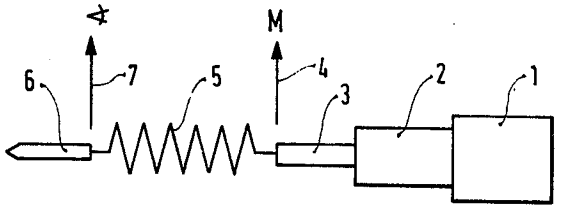
FIG.1
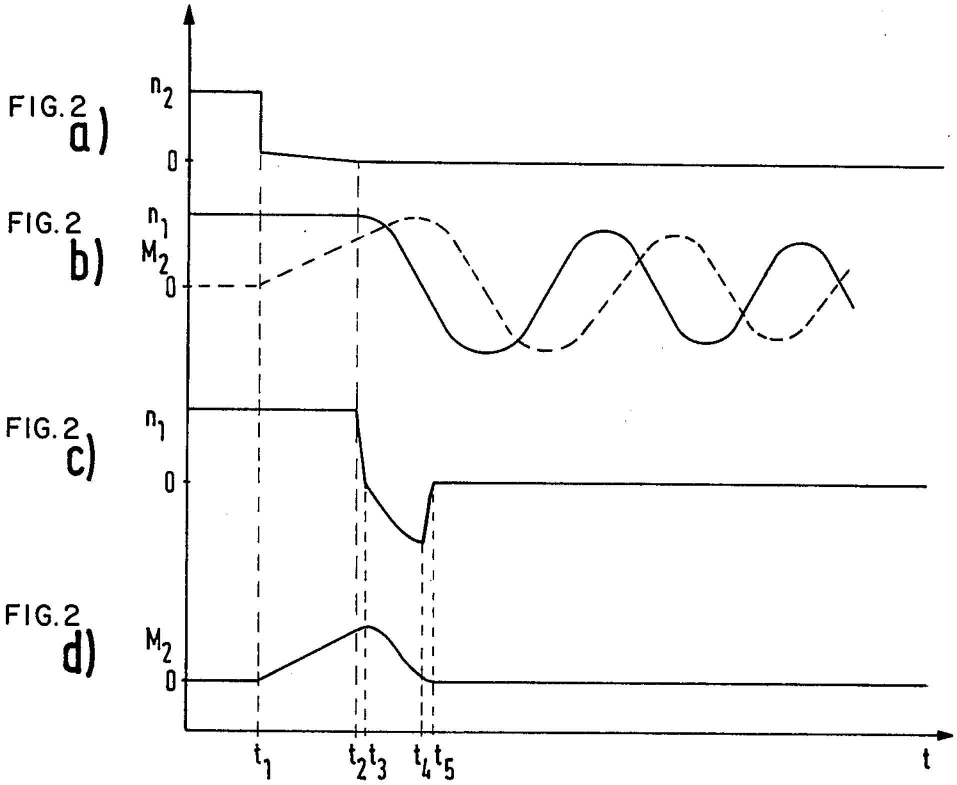

METHOD AND APPARATUS FOR SHUTTING OFF A POWER SCREWDRIVER

This invention concerns a power screwdriver of the kind that uses a spring coupling.

Power screwdrivers have become known in which the workshaft or spindle is coupled by a spring to a drive shaft driven by the motor. This spring, which is designed for a certain maximum torque to be transmitted, with respect to its twist angle characteristic, has the function of stretching out the screwdriving operation. In this way it is made sure that after the screw is tight, there remains enough time for the response of the electronic circuit and the switch-off operation. After shut-off the spring is in an energized condition. A mechanical oscillation system is then formed together with the tightened screw and the drive motor that freely oscillates when the motor is shut off without braking while the spring is energized (compressed or tensioned, according to the design). This has a shaking effect on the operator, which makes the operation of the tool difficult. There is furthermore the danger that the tightened screw fastening will be released at least in part by the oscillatory movement. There is the further possibility to separate the work spindle from the motor by a clutch at the appropriate moment. This, however, requires a high mechanical force, because the spring is energized at the time of switch-off. It is therefore difficult to prevent kickback in such a tool.

THE INVENTION

It is an object of the present invention to provide for a smoother and more reliable shut-off of the power screwdriver.

Briefly, when the prescribed torque limit is reached, the motor is reversed, and after a predetermined short period, the motor is either shut off and allowed to coast, and then after a further predetermined period, the motor is briefly or momentarily driven in the original direction. The method of the invention has the advantage that the reaction torque felt by the operator has merely a characteristic that rises once and falls again. In that way the handling of the device is greatly facilitated and shaking effects on the operators do not occur. There is a further advantage that the rise of the torque, after the stop signal appears, is reduced to a minimum. Mechanical decoupling does not need to be provided.

The particular instants for switching the motor on and off are essentially determined by the spring-mass system and are therefore constant. If different kinds of springs are to be interposed, it is advantageous for the timing of the switch-off not to be constant, but rather to be provided by the screwdriving process itself. Thus, it is advantageous to switch the motor drive into reverse when its speed is zero. It is further advantageous to switch the motor back on in the original direction when the torque of the spring goes below a prescribed value of torque. The motor drive is best switched off when the drive shaft speed is zero. These magnitudes can be determined from the torque measurement or the derivative of the angle measurement and can usefully be applied to control of the reversing electronics. It is also desirable for reverse operation to be switched in only if the current in the previous operating condition is switched off. It is thus assured that short-circuits will not arise. The method for switching off a power screwdriver according to the invention is best implemented by the use of a bridge circuit containing controllable semiconductors that are switched in pairs. It is thus possible to obtain most simply, short reversal and pause times which are easily reproducible. The constituion of the control electronics is particularly simple when timing circuits are used for timing the steps of the dynamic braking procedure.

In order to be independent of the torsion spring and of the screwdriver, it is advantageous to make the reversing operation dependent at least in part on the signals of measuring value transducers. The control electronics are thereby universally usable.

It is also advantageous to provide means that prevent the switching in of one bridge part when the other bridge part is switched in or when a semiconductor switch of another bridge branch is carrying current. In this manner the result is obtained that the entire power screwdriver does not fail as the result of an error or a short-circuit in the control system. Furthermore, breakdowns of the semiconductor switches can be recognized and the power screwdriver consequently put out of operation. It is also favorable to constitute the semiconductor switches as triacs and to connect a resistance into the anode conductor of each triac, and then to put a capacitor in parallel with the series circuit composed of the triac and the series resistance. False ignition of the triac, which could otherwise be produced by disturbing voltages originating with the motor, or by the firing of a reverse triac, is greatly reduced by these RC networks.

THE DRAWING

The invention is further described by way of illustrative example with reference to the annexed drawings, in which:

FIG. 1 shows the basic components of an electric power screwdriver having a torsion spring;

FIG. 2 is a diagram for explaining what occurs in the power screwdriver apparatus of FIG. 1 with and without the apparatus and procedures of the invention;

DESCRIPTION OF THE ILLUSTRATED EMBODIMENTS

Figure 3:
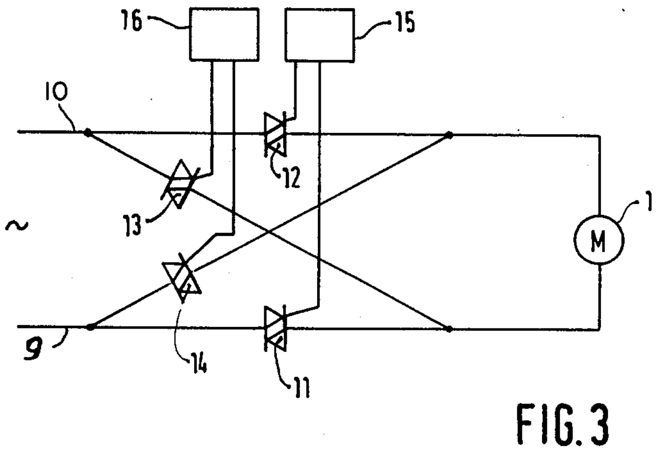
FIG. 3 shows the basic circuit for rapid switching control of the motor of a power screwdriver.

FIG. 1 diagrammatically shows a power screwdriver such as is used for driving the screws that hold a vehicle motor onto the vehicle frame. The drive motor 1 is constituted as an electric motor, although a compressed air motor could also be used for the purpose. A gear box 2 is mounted in front of the motor 1. A drive shaft 3 projects out of the gear box 2. The drive shaft 3 is connected with a workshaft or spindle 6 by means of a torsion spring 5. This torsion spring is designed, as regards its twist angle, for the maximum torque to be transmitted and serves the function to extend the screwdriving operation in time, especially in the case of "hard" screw situations. Time is thereby gained for the response of the electronics and for the switch-off operation controlled thereby. A torque measuring device 4 and an angle measuring device 7 make it possible to determine and to indicate the screw tightening torque and the screw-in total rotary angle.

After the predetermined torque is reached, the screwdriver must be switched off in a suitable way. In this operation, account is to be taken of the fact that the spring 5 forms a mechanical oscillating system together with the motor 1 and the gear box 2. With the screwing-in of the screw and the tightening of the screw head, the spring 5 is energized (usually by compression) as the result of operation of the motor 1 and the gear box 2. When the desired tightening torque is reached, this torque corresponding to the torsion torque of the spring 5 at the time, a stop signal is delivered. The events that then follow may now be further explained with reference to FIG. 2.

In the portion (a) of FIG. 2, the rotary speed n2 of the work shaft 6 is shown as plotted against time. At level (b) of FIG. 2, there is shown in a solid line the rotary speed n1 of the drive shaft 3, and the torque M2 at the motor 1 is shown in broken lines.

Until the moment t1, the screw is screwed in by the drive shaft. At the moment t1, the screw comes against a workpiece which the screw is serving to connect. Whereas now the speed n1 at the drive shaft is unchanged, the speed n2 at the work shaft 6 drops sharply during the tightening process. At the same time the spring 5 is twisted, which is evident by the rise of the torque M2. If now at the moment t2, with the reaching of a suitable torque, the screwdriver is switched off, oscillation effects appear. Because of the rotation energy stored in the motor 1 and the gear box 2, the spring 5 is yet further energized, in fact up until the moment at which the speed n1 has fallen to zero. This is clearly visible in FIG. 2 at level (b). The tightening torque accordingly rises, so that the switching off of the screwdriver would already have to have taken place at an earlier moment in order to avoid an overdriving of the screw connection. After the motor comes to a stop, however, the potential energy stored in the spring drives the motor again through the gear box, and this operates in the opposite direction of rotation, i.e., the spring 5 relaxes delivering rotary energy through the motor. The spring/mass system then executes damped sinusoidal oscillations in a known way. The operator would notice these oscillations as shaking effects and would have to take up a reaction torque alternating in direction. The negative torque M2, especially in the first half period after the switching off of the screwdriver, also has a loosening effect on the screw fastening.

At level (c) of FIG. 2, the behavior of the drive speed n1 on the drive shaft 3 is shown for the case of the method of the invention. With the switching off of the screwdriver at the moment t2, the motor n1 is driven in the reverse direction and thereby brought to a stop as fast as possible. This momentary stop is reached at the moment t3. Since this time lapse is much shorter than in the case of a free running out of the motor 1, the torque M2 also climbs a bit more by the twisting of the spring 5, as can be deduced from level (d) of FIG. 2. When the speed zero is reached, the motor is entirely switched off. In the time interval from t3 to t5, the spring 5 can discharge its energy, while the motor during this operation is driven in the opposite direction. The speed n1 of the drive shaft 3 therefore becomes negative in the time interval t3 to t5. The torque M2 falls off. Shortly before the torque M2 reaches the value zero, the motor 1 is rotated in a second reversal into the original direction of rotation, until it comes fully to a stop, i.e., the speed in one has again become zero. This operation takes place in the time interval t4 to t5. By this process, two reversing operations separated in time from each other, respectively taking place from t2 to t3 and from t4 to t5, the excess energy of motor and spring is removed from the system in the fastest possible way. The pause interval from t3 to t4 is typically smaller than half of a period of the free-swinging system. The result is obtained by the process described that the torque increase after the appearance of the switch-off signal is reduced to a minimum and that the reaction torque acting on the operator is left with only a rising and then falling characteristic. A shaking effect does not occur. After a short time the screwdriver device is available for the next screwdriving operation.

The switch-off system of the invention, because of the necessary short reversing and pause intervals is advantageously constituted electronically. Both in the case of three-phase asychronous a.c. motors and in the case of universal motors, the reversing operation requires merely an interchanging of two phases or conductors. A fully controllable bridge circuit, such as is shown in FIG. 3, can serve the purpose of providing such rapid interchanges of connections. So-called triacs are the type of semiconductor switches particularly suitable for full-wave switches in this circuit.

As shown in FIG. 3, a triac 12 is connected to the power line and has its output signal provided by an electrical connection to the motor 1. On the other side of the circuit through the motor 1, another triac 11 is interposed between the motor 1 and the power line. The power conductors are designated and are indicated in FIG. 3 as being energized with alternating voltage at the usual power frequency and voltage magnitude.

A triac 13 is connected between the power line 10, to which the triac 12 is connected, and the connection between the triac 11 and the motor. The latter connection goes to the anode of the triac 11. Between the power line 9, which is connected to the cathode of the triac 11, and the connection of the anode of the triac 12 to the motor 1, there is interposed a triac 14, thus completing a triac bridge. The anodes of the respective triacs, as diagramed in FIG. 3, are the terminals of the triac switching path that are located on the same side of the triac as the control electrodes, all of which are connected to one or the other of the control circuits 15 and 16.

The control grids of the triacs 11 and 12 are connected to a first switching circuit 15, whereas the control grids of the triacs 13 and 14 are connected to a second switching circuit 16.

In screwdriver operation, the triacs 11 and 12 are ignited, so that the motor 1 operates in righthand revolution. In reverse operation, i.e., for lefthand revolution of the motor 1, the triacs 13 and 14 are ignited, while the triacs 12 and 11 are blocked. In coasting operation, all triacs are blocked. In the lastmentioned type of operation, the motor runs merely on the stored energy of its rotating parts or of the spring coupling, or both.

Figure 4:
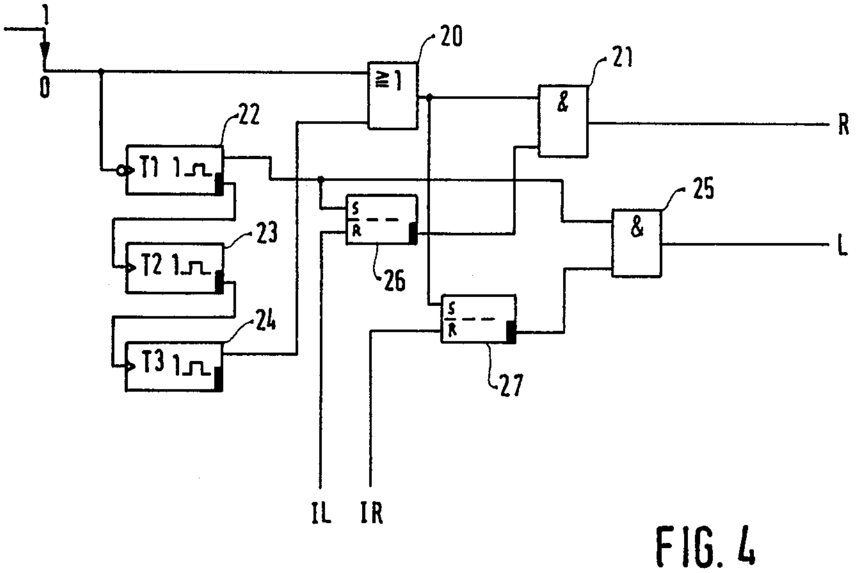
FIG. 4 is a circuit diagram of an embodiment of reversing control electronics for the circuit of FIG. 3.

FIG. 4 shows an example of a control circuit for the triacs 11, 12, 13 and 14. A switch-off pulse, provided automatically (by means symbolized at the upper left of FIG. 4) in response to the application of torque exceeding a predetermined torque magnitude, is provided at the upper left of the diagram and is supplied on the one hand to an OR-gate 20 and, on the other hand, to the dynamic input of a timing circuit 22 constituted as a monoflop (monostable multivibrator). The output of the OR-gate 20 is supplied to one input of the AND-gate 21.

The inverting output of the timing monoflop circuit 22 is connected to the dynamic input of a second monoflop timing circuit 23, the inverting output of which is in turn connected to the dynamic input of a third monoflop timing circuit 24. The known inverting output of the latter is connected to a second input of the OR-gate 20. The non-inverting output of the first monoflop timing circuit 22 is connected with one input of a second AND-gate 25. The output of the OR-gate 20 is also connected to the set input of a flipflop 27. A second flipflop 26 has its set input connected to the non-inverting output of the first monoflop timing circuit 22 and its inverting output connected to the second input of the AND-gate 21, while the inverting output of the flipflop 27 is similarly connected to the second input of the AND-gate 25.

The output of the AND-gate 21 controls the righthand switching circuit 15 for the motor, while the output of the AND-gate 25 provides signals for the lefthand control circuit 60 for the motor. The output connections in FIG. 4 and the circuits 15 and 16 are accordingly designated R and L to indicate the facts just mentioned.

The reset input of the flipflop 26 is connected with a current recognition circuit of the triacs which is switched in when the motor turns to the left. The reset input of the flipflop 27 is connected with current control devices which monitor the triacs that are switched in during righthand revolution of the motor 1. The provision of such connections to the triacs of FIG. 3 under control by the circuit of FIG. 4 is described further below with reference to FIG. 5.

During screwdriving operation, a logic-1 signal is supplied through the OR-gate 20 to one input of the AND-gate 21. The AND-gate 21 passes this signal on by providing an output only when no signal for driving the motor to the left is present, and when the triacs serving leftward drive are extinguished. When this is the case, the flipflop 26 is reset, i.e., its inverting output supplies a logic-1 signal. This means that the control circuit 15 for righthand revolution is free to operate. If the nominal torque limit is reached, the screwdriver is switched off at the moment t2 (FIG. 2). By the trailing edge of the switched off logic-1 signal at its input, the timing monoflop circuit 22 operates for the interval T1, which corresponds to the time interval from t2 to t3 of FIG. 2. The motor 1 must now be quickly switched over from righthand to lefthand rotary power. The output signal of the timing monoflop 22 on the one hand sets the flipflop 26 so that its inverting output will block the AND-gate 21. The latter, which was already blocked by the switch-off signal (change from logic-1 to logic-0) now becomes blocked also by the output signal of the flipflop 26, so that an inadvertent operation of the triacs for righthand revolution becomes impossible. As soon as the triacs for righthand revolution are finally quenched, a reset pulse is supplied to the reset input of the flipflop 27 which had been set over the connection from the output of the OR-gate 20. This means that now the control circuit 16 for lefthand rotary powering is free to operate. A signal for operation of the circuit 16 is then supplied over the AND-gate 25, for igniting the triacs 13 and 14 for lefthand revolution of the motor 1. The AND-gates 21 and 25 and the flipflops 26 and 27 assure that when switching over is performed from the triac pair 11 and 12 to the triac pair 13 and 14, the triacs 11 and 12 are emptied of current before the triacs 13 and 14 are ignited. Otherwise the danger of a short-circuit would exist.

After the lapse of the time interval T1, the timing monoflop circuit 23 is set by the rising flank of the inverting output of the timing monoflop circuit 22. Since now the non-inverting output of the timing circuit 22 is zero, the triacs responsible for lefthand rotary power are now also blocked. The timing circuit 23 that times the interval T2, corresponding to the interval from t3 to t4 in FIG. 2, serves as the pause timer for the pause in which the motor is switched into "coasting" operation (no current at all supplied to its windings). After the lapse of the pause interval, the third timing circuit 24 is set, which once more switches in righthand drive. After the lapse of the time interval T3, which corresponds to the time from t4 to t5 of FIG. 2, both control lines R and L are free of signals, and the motor-stopping operation is completed. This stopping operation may be regarded as a special kind of dynamic braking.

The timing intervals T1, T2 and T3 are essentially prescribed by the spring and mass system provided by the motor and its spring coupling. The intervals T1 and T2 must, in particular, be fitted to the torque at the instant of switch-off. It can be stated generally that with increasing torque M2, the time interval T1 must be smaller and the time interval T3 greater.

The use of timing circuits 22 to 24 provides a particularly simple way of constituting the control electronics for the system of the invention. For more complex screwdriving operations, it is advantageous to use, instead of the output signals of the timing circuits, the output signals of the torque responsive signal generator 4 and of the total-angle-signal generator 7. Switching in of lefthand rotary power can take place when the switch-off pulse is supplied by the torque signal generator. Lefthand powering is terminated in that case when the speed of rotation of the shaft 3 is zero. This can be determined by measuring the angular velocity that can be obtained from the angle signal. Righthand powering of the motor 1 will then be again switched in when, subsequent to the switching off of the screwdriver, the torque drops below a prescribed value. Since the torque signal generator is already present, only an additional threshold switch needs to be provided in order to obtain the corresponding control signal. The dynamic braking operation is terminated when the rate of revolution of the drive shaft 3 has again become zero. This also can be recognized by means of an angle-signal generator.

Figure 5:
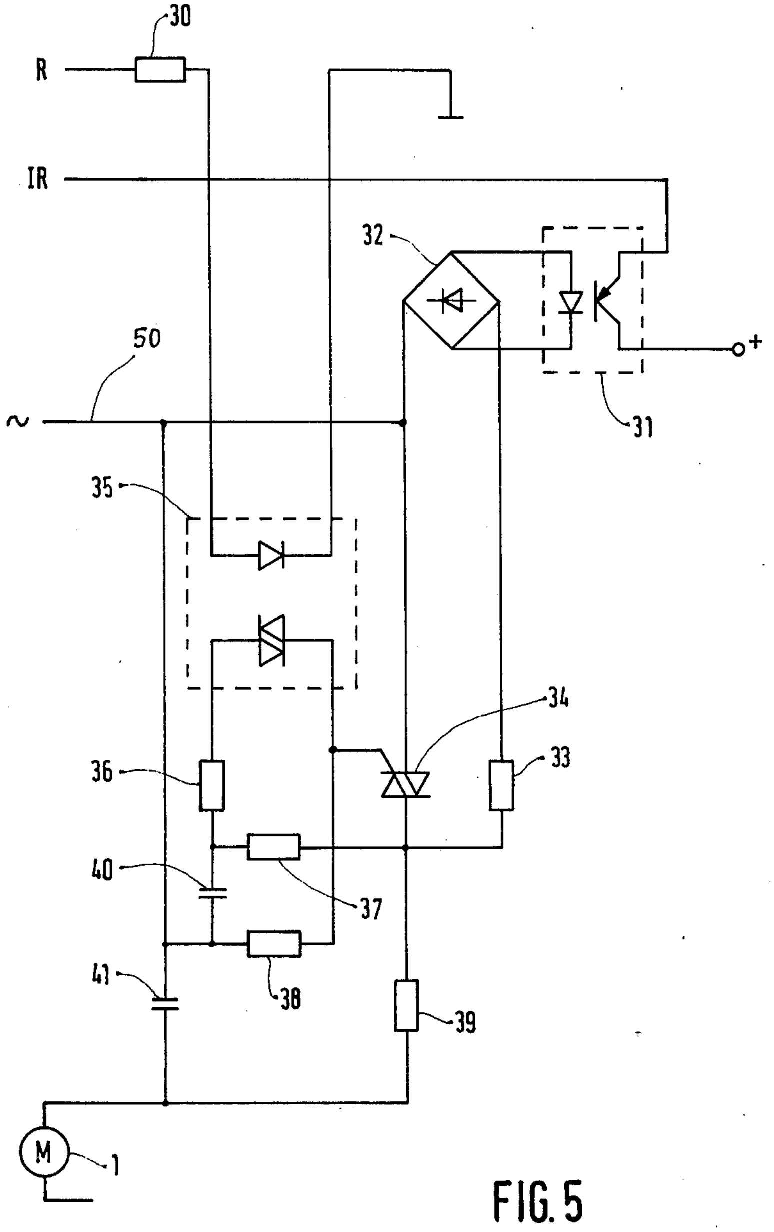
FIG. 5 is an embodiment of a bridge arm of the basic control circuit shown in FIG. 3.

In FIG. 5, there is shown an example of the control circuit for a triac. The triac 34 can for example be the triac 11 or the triac 12 of the circuit of FIG. 3. The output signal at the output R of FIG. 4 is provided, as shown in FIG. 5, to an input resistor 30. In series with the resistor 30, there is connected the light emitting diode (LED) of an optical coupler 35, the other terminal of the LED being connected to ground. An alternating voltage signal on the power line conductor 50 goes on the one hand to a triac 34 which is connected in series with a resistor 39. The other end of the resistor 39 is connected with one input of the motor 1. In parallel to the series combination of the resistor 39 and the triac 34, there is connected a capacitor 41. The a.c. power line conductor 50 is also connected to a resistor 38 and a capacitor 40. The other terminal of the resistor 38 leads on the one hand to the grid of the triac 34 and on the other hand to a trigger diode of the optical coupler 35. The other connection of the trigger diode of the optical coupler 35 goes to the resistor 36, the other terminal of which is connected with the aforesaid capacitor 40. The common connection of the resistor 36 and the capacitor 40 is also connected to a resistor 37, the other terminal of which is connected to the common connection of the resistor 39 and the triac 34. At this same connection point, there is also connected the resistor 33, the other terminal of which leads to a rectifier 32 which is connected with the a.c. line conductor 50. The output signal of the rectifier 32 leads to the LED of an optical coupler 31 constituted as a phototransistor, and is connected to a positive voltage supply, and its emitter with the reset input of the flipflop 27 of FIG. 4.

When a signal is present on the line R, the LED of the optocoupler 35 lights up, so that the triac 34 is ignited. Thereafter there is no longer a voltage across the triac 34, so that the LED of the optocoupler 31 is extinguished. A logic-1 signal then appears at the output IR, so that the flipflop 27 (FIG. 4) is reset. The triac group for lefthand revolution is accordingly blocked by the AND-gate 25. As soon as righthand revolution stops, the LED of the optocoupler 35 goes out. At the next null transition of the alternating voltage, the triac 34 is likewise extinguished. The operating voltage now reappears across the triac 34, the LED of the optocoupler 31 lights up and accordingly the flipflop 27 of FIG. 4 is made ready to be set. It is to be understood that when there are two triacs, the corresponding optocouplers 31 have their receiving-side connections put in series, so that the flipflop 27 can be set only when both triacs 34 are conducting no current.

The danger of a direct short-circuit across the power line can also arise by mis-ignition of the triacs. Disturbing voltage pulses generated by the motor or arising from the ignition of the opposite groups of triacs lead to overriding ignition of the triacs that are to be blocked. In order to prevent this, a resistor 39 is interposed in the anode 9 of the triac 34 and a capacitor 41 is arranged in parallel thereto. By this precaution, an overriding ignition of a blocked triac is prevented.

Although the invention has been described with reference to a particular illustrative embodiment, it will be understood that modifications and variations are possible within the inventive concept.

We claim:

1. Method of switching off a power screwdriver equipped with a motor, a spring coupling system and a screwdriving tool, comprising the steps of:

running the tool in the normal direction in a screwdriving operation;

reversing the direction of rotary force in the motor when a predetermined torque value is exceeded by the torque applied to the screwdriving tool;

after powering the motor for rotary force in the reverse direction for a first predetermined time interval, switching off the supply of power to the motor and allowing the motor to coast, and after the lapse of a second predetermined time interval, powering the motor for rotary force in the original direction of rotation for a brief third interval time.

2. Method according to claim 1, in which the end of said first time interval in which said motor is operated in the reverse direction takes place when the rotary speed of said motor is substantially zero.

3. Method according to claim 1, in which said second time interval is caused to terminate when the torque transmitted by said spring coupling diminishes below a predetermined value of torque after the switching off of power to the motor.

4. Method according to claim 2, in which said second time interval is caused to terminate when the torque transmitted by said spring coupling diminishes below a predetermined value of torque after the switching off of power to the motor.

5. Method according to claim 2, in which said brief third time interval in which said motor is powered in the original direction of rotation following the end of said second time interval is terminated when the rate of rotation of the motor is substantially zero and said spring coupling is substantially unstressed.

6. Method according to claim 4, in which said brief third time interval in which said motor is powered in the original direction of rotation following the end of said second time interval is terminated when the rate of rotation of the motor is substantially zero and said spring coupling is substantially unstressed.

7. Method according to claim 1, in which the beginning of the step of powering the motor in the reverse rotary force direction is started only after the current in all paths passing through said motor in its previous operating connections has diminished to zero.

8. Method according to claim 2, in which the beginning of the step of powering the motor in the reverse direction of rotation is started only after the current in all paths passing through said motor in its previous operating connections has diminished to zero.

9. Method according to claim 4, in which the beginning of the step of powering the motor in the reverse direction of rotation is started only after the current in all paths passing through said motor in its previous operating connections has diminished to zero.

10. A power screwdriver equipped for automatic stopping, comprising a reversible motor having an energizing winding and capable of being reversed by reversing the electrical connections of said winding;

a drive shaft mounted so as to be driven by said motor;

a screwdriver tool;

a spring coupling for coupling said screwdriver tool mechanically to said drive shaft;

a power cord for connecting the power screwdriver to an electrical power line;

a full-wave bridge circuit of electrically controllable semiconductor switches interposed between said power cord and said winding of said motor;

circuit means for controlling said bridge circuit for operating said motor in either direction and assuring that the beginning of operation of said motor in any direction takes place only when the portion of said bridge circuit related to operation of the motor in the other direction is conducting no current; and control means for causing said control circuits to provide operation of said motor in its normal screwdriving direction from the beginning of a screwdriving operation until a predetermined torque is transmitted by said spring coupling, for thereafter operating said motor to produce rotary force in its reverse direction for a first predetermined period of time, for thereafter removing the application of power to said winding of said motor for a second predetermined period of time, for thereafter operating said motor to produce force in its normal direction of operation for a third predetermined period of time, and for switching off power to said motor winding at the end of said third predetermined period of time.

11. Apparatus according to claim 10, in which means are provided for timing said first, second and third periods of time by electronic timing circuits.

12. Apparatus according to claim 10, in which means are provided for determining the end of said first, second and third periods of time, at least in part by signals from at least one transducer connected to said drive shaft, said spring coupling, or said screwdriver tool.

13. Apparatus according to claim 10, in which said electrically controllable semiconductor switches of said full-wave bridge circuit are triacs.

14. Apparatus according to claim 13, in which a resistor (39) is interposed in the anode connection of each of said triacs (34) and in which a capacitor (41) is connected in parallel with the series combination of each said triac (34) and the said resistor (39) connected to the anode thereof.

* * * * *